US00RE35739E

United States Patent [19]

Ellison et al.

[11] E Patent Number: Re. 35,739

[45] Reissued Date of Patent: Feb. 24, 1998

[54] DECORATIVE SHEET MATERIAL SIMULATING THE APPEARANCE OF A BASE COAT/CLEAR COAT PAINT FINISH

[75] Inventors: Thomas M. Ellison, Ft. Mill, S.C.; Robert A. Winton, Newtown, Pa.

[73] Assignee: Rexam Industries Corp., Charlotte, N.C.

[21] Appl. No.: 317,758

[22] Filed: Oct. 4, 1994

Related U.S. Patent Documents

Reissue of:

[64] Patent No.: 4,810,540
Issued: Mar. 7, 1989
Appl. No.: 924,299
Filed: Oct. 28, 1986

[51] Int. Cl.[6] ..... B60R 13/04

[52] U.S. Cl. ..... 428/31; 428/40.7; 428/46; 428/208; 428/343; 428/908.8

[58] Field of Search ..... 428/31, 343, 46, 428/208, 908.8, 40.7

[56] References Cited

U.S. PATENT DOCUMENTS

| | | | |
|---|---|---|---|
| 2,880,542 | 4/1959 | Butterweich | 428/208 |
| 3,524,906 | 8/1970 | Schmitt et al. | 428/142 X |
| 3,549,405 | 12/1970 | Schrenk et al. | 428/142 |
| 3,679,510 | 7/1972 | Corley et al. | 428/31 X |
| 3,697,070 | 10/1972 | McAdow | 523/200 X |
| 3,806,397 | 4/1974 | Kukoff | 428/40 |
| 3,949,139 | 4/1976 | Dunning | 428/328 |
| 3,988,494 | 10/1976 | McAdow | 427/214 X |
| 4,126,727 | 11/1978 | Kaminski | 428/208 X |
| 4,215,170 | 7/1980 | Oliva | 428/208 X |
| 4,263,077 | 4/1981 | Rampelberg | 428/151 X |
| 4,307,149 | 12/1981 | Scott et al. | 428/208 X |
| 4,311,757 | 1/1982 | Raghava | 428/208 X |

(List continued on next page.)

FOREIGN PATENT DOCUMENTS

| | | | |
|---|---|---|---|
| A-0230 364 | 7/1987 | European Pat. Off. . | |
| 58-136438 | 8/1983 | Japan . | |
| A-59-227447 | 12/1984 | Japan . | |
| 62-138213 | 6/1987 | Japan . | |
| 1232971 | 5/1971 | United Kingdom | 428/31 |
| A-2084513 | 4/1982 | United Kingdom | 428/31 |

OTHER PUBLICATIONS

Plastic Coating Printing Handbook.

"Automotive Coatings—Helping Detroit woo consumers", *Chemical Week*, Jul. 4, 1984, p. 31.

"Automotive Coatings Helping Detroit Woo Consumers", *Chemical Week*, Jul. 4, 1994.

S. Ricklin, "Solvent–cast films", *Plastics Engineering*, May 1983, pp. 29–33.

Avery's Answer and Counterclaim, dated Jan. 26, 1995.

Avery's Motion to Dismiss to be Treated as a Motion for Summary Judgment, and supporting documents, filed Oct. 20, 1994.

*Chemical Week*, Jul. 4, 1984, p. 30, Automotive Coatings: Helping Detroit Woo Consumers.

*Polymers Paint Colour Journal*, Oct. 29, 1980, p. 796, the Orientation of Aluminium. Pigments in Automotive Finishes, contributed by Toyo Aluminium K.K.

*Primary Examiner*—Henry F. Epstein
*Attorney, Agent, or Firm*—Bell, Seltzer, Park & Gibson, P.A.

[57] ABSTRACT

A flexible decorative sheet material for use in surfacing automobile body panels and the like is disclosed. The sheet material is characterized by having the appearance of a base coat/clear coat paint finish. The material comprises a substantially transparent outer layer, and a pigmented coating on the undersurface of the outer layer which is visible therethrough. The pigmented coating preferably has reflective flakes uniformly distributed therein to impart to the sheet material the appearance of a base coat/clear coat paint finish. Also disclosed are shaped articles which have such sheet materials adhered to one side thereof, and a method for making such sheet materials.

27 Claims, 1 Drawing Sheet

U.S. PATENT DOCUMENTS

| | | | |
|---|---|---|---|
| 4,359,491 | 11/1982 | Lai-Chun | 428/208 X |
| 4,396,680 | 8/1983 | Chang | 428/31 X |
| 4,409,280 | 10/1983 | Wiley et al. | 428/208 X |
| 4,451,522 | 5/1984 | de Vroom | 428/201 |
| 4,501,852 | 2/1985 | Markusch et al. | 524/762 X |
| 4,533,592 | 8/1985 | Binkham | 428/213 |
| 4,578,426 | 3/1986 | Lenz et al. | 525/123 X |
| 4,678,690 | 7/1987 | Palmer et al. | 428/31 |
| 4,769,100 | 9/1988 | Short et al. | 428/31 X |
| 4,818,589 | 4/1989 | Johnson et al. | 428/201 |

DECORATIVE SHEET MATERIAL SIMULATING THE APPEARANCE OF A BASE COAT/CLEAR COAT PAINT FINISH

Matter enclosed in heavy brackets [ ] appears in the original patent but forms no part of this reissue specification; matter printed in italics indicates the additions made by reissue.

FIELD OF THE INVENTION

The present invention relates to sheet materials generally, and particularly relates to a sheet material which can be used to provide a decorative surface on automobile body panels and the like.

BACKGROUND OF THE INVENTION

Among the most important selling features of automobiles is the quality of their painted finish. For this reason, nearly half of automobile assembly costs are devoted to coating operations. See generally, Automobile Coatings: Helping Detroit Woo Consumers, Chemical Week, 30 (July 4, 1984). As aerodynamic body styles become more prevalent, and sharp edges and other decorative detail features continue to be removed from automobile bodies, paint finish will exert an increasingly important influence on the overall decorative appearance of automobiles.

For these reasons, about 70% of the cars sold in the U.S. market are coated with a metallic finish. The difference in brightness and hue obtained when such a finish is observed emphasizes the styling lines of the car, highlighting small curvatures. This effect is known as "flop." The new base coat/clear coat paint finishes, which provide "wet look" paint finishes with or without a metallic appearance, can be used to produce a very high quality metallic finish with excellent flop, and are emerging as the finish of choice in the automobile industry. See, e.g., J. Schrantz, Painting the Corvette, Industrial Finishing, 18 (March, 1984). In addition, because the clear coat protects the base coat, greater quantities of pigments can be incorporated into the base coat without the weatherability of the finish being unacceptably decreased. Base coat/clear coat finishes, however, and particularly metallic finishes, pose significant (and expensive) pollution problems arising from the evaporation of harmful paint solvents. Moreover, they are difficult to provide on plastic automobile body panels, which are becoming a popular mode of construction in the industry. Finally, base coat/clear coat paint finishes in general involve multiple painting steps which are very expensive to perform when high quality standards are maintained.

Accordingly, objects of the present invention are to provide a way to produce automobiles and the like with high quality decorative finishes like a base coat/clear coat finish, which can be used on molded plastic body panels, which does not require expensive painting steps, and which serves to reduce the emission control problems previously faced by manufacturers who wished to produce automobiles with base coat/clear coat finishes.

SUMMARY OF THE INVENTION

The foregoing objects are achieved by a flexible decorative sheet material, disclosed herein, for use in surfacing automobile body panels and the like. This sheet material is characterized by having the appearance of a base coat/clear coat paint finish when viewing the outer surface thereof. The sheet material comprises a substantially transparent outer layer and a pigmented coating on the undersurface of the outer layer and visible therethrough. The pigmented coating optionally has reflective flakes uniformly distributed therein to impart to the sheet material the appearance of a metallic base coat/clear coat paint finish.

The reflective flakes in the pigmented coating are preferably oriented generally parallel to the outer layer. The outer layer is also preferably formed from a substantially clear film. The pigmented coating is preferably of a thickness less than that of the substantially clear film. The precise thickness of the pigmented coating is, however, selected to impart the specific predetermined appearance to the sheet material which is desired.

Sheet materials of the present invention include dual-color sheet materials which comprise a substantially transparent outer layer and a pigmented coating on the undersurface thereof, wherein the pigmented coating comprises a first pigmented coating on certain portions of the undersurface of the outer layer and visible therethrough, and a second pigmented coating of a different color on certain other portions of the undersurface of the outer layer, which second pigmented coating is also visible therethrough.

Also disclosed herein are shaped articles having a contoured decorative outer surface suitable for use as automobile body panels and the like. The articles comprise a supporting substrate and a decorative sheet material adhered to one side of the substrate, conforming to the contoured surface, to impart to the outer surface the appearance of a base coat/clear coat paint finish. The decorative sheet material is as described above. The supporting substrate, which may be formed of a number of materials, is preferably a rigid metal substrate or a molded polymer substrate.

Also disclosed herein is a method for making a decorative sheet material of the type described above. This method comprises applying to one surface of a substantially clear polymer film, a thin coating of a pigmented polymer. The pigmented polymer preferably has reflective flakes uniformly distributed therein. The method is also described as comprising the steps of forming a substantially clear polymer film on a carrier, coating the film with a pigmented polymer optionally having reflective flakes uniformly distributed therein, and removing the coated film from the carrier.

The polymer film is preferably formed by reverse roll coating a solution of the polymer onto the carrier. The step of applying a thin coating of a pigmented polymer to the film preferably comprises spraying a pigmented polymer which optionally has reflective flakes suspended therein onto the film, and drying the solution to form a thin, pigmented coating. The pigmented polymer is preferably sprayed on the substantially clear film before the film has solidified.

The present invention allows paint and finish handling steps involving solvents to be performed in a central plant, and the "finish" to be shipped, in sheet form, to a number of automobile assembly plants and the like. This sensibly allows solvent emission control problems attendant to such procedures to be handled in a centralized location, reduces the emission control expenses at numerous assembly plants, and serves to reduce the cost and complexity of solvent emissions control in general.

DETAILED DESCRIPTION OF THE INVENTION

Figure 1:
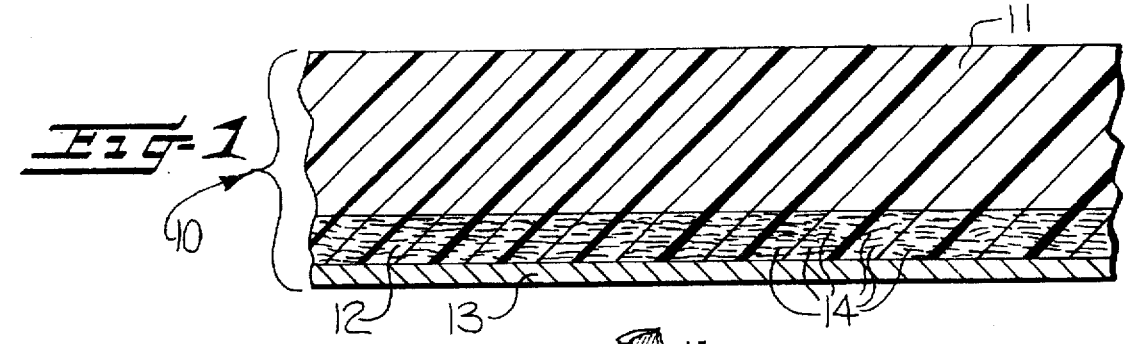
FIG. 1 is a cross-sectional view of a decorative sheet material of the present invention.

A decorative sheet material 10 of the present invention is illustrated in FIG. 1. The sheet material comprises a substantially clear film 11, a pigmented coating 12 on the undersurface of the preformed film, and an adhesive layer 13 carried by the inner surface of the pigmented coating. The pigmented coating has reflective flakes 14 uniformly distributed therein. The pigmented coating is opaque and uninterrupted; the reflective flakes are aluminum flakes or mica flakes. Mica flakes used in the present invention may be untreated, or tinted or otherwise surface treated, as known in the art. The reflective flakes are oriented generally parallel to the preformed film, with the flakes preferably being oriented so the mean angle of inclination of the flakes to the preformed film is less than about 6.5 degrees. The precise limits of the angle of inclination depends on a number of conditions, including the particular type of reflective flake used, the composition of the pigmented coating, and the composition of the preformed film.

Figure 2:
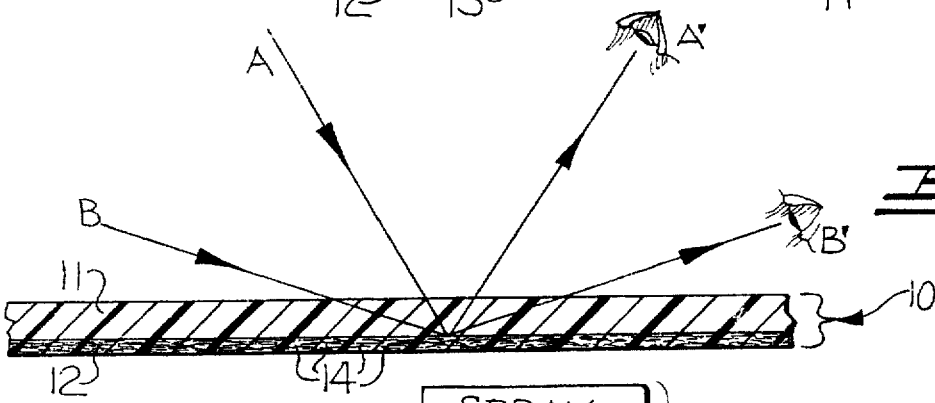
FIG. 2 is a schematic diagram which illustrates the properties of sheet materials of the present invention.

The flakes contribute to the "flop" effect described previously. Flop is due to the orientation of the reflective flakes generally parallel to the surface of the finish. As illustrated in FIG. 2, the observer at A' sees the light A reflected by the flakes. A similar situation exists for the observer at B' with light B. Because of the phenomenon of flop, light intensity is lower at B' than A'; i.e., the finish appears darker at B' than A'.

Films 11 for practicing the present invention should be selected so they are pigmentable, thermoformable and weatherable. The film 11 is about 0.5 to about 300 thousandths of an inch thick, and is preferably from about one to about two thousandths of an inch thick. Such films are preferably substantially molecularly unoriented cast films, as opposed to films which have been oriented or biaxially oriented, and are preferably substantially colorless. The cast film is formed before the pigmented coating is applied thereto. Such films are prepared by a number of known liquid casting methods, such as by spreading a solvent solution having a polymer dissolved therein onto a carrier with a casting die, doctor bar, or reverse roll coater, then evaporating the solvent, and then stripping the polymer film from the carrier. The reverse-roll coating method is the preferred method of making liquid cast films for the present invention. Other liquid casting methods are also known and useful for practicing the present invention. In appropriate cases, a plastisol, organosol, or dispersion of the polymer can be cast onto the carrier instead of a solvent solution. For example, polytetrafluoroethylene, which is virtually insoluble, can be liquified and cast as a dispersion. Such liquid cast film processes, and some current uses of cast films, are discussed in Plastics Engineering, at pages 29–33 (May, 1983). Thus, for purposes of the present invention, "substantially molecularly unoriented cast films" are liquid cast films, and not melt cast films or films formed by extrusion.

Polymers suitable for forming such cast films are preferably weatherable polymers selected to provide a pigmented film which will not significantly fade, peel, crack, or chalk when exposed to the environment, for the intended life of the product for which the decorative sheet material is made. A number of known testing procedures, in which objects are exposed to either the natural environment over an extended time or a harsh artificial environment for a short time, are used to determine the weatherability of polymers. Such weatherable polymers include fluoropolymers, acrylate polymers, urethane polymers, vinyl polymers, and blends thereof. Acrylate polymers useful for practicing the present invention are obtained from a variety of acrylic monomers, such as acrylic and methacrylic acids, and their amides, esters, salts, and corresponding nitriles. Particularly suitable monomers for such polymers are methyl methacrylate, ethyl acrylate, and acrylonitrile. The polymers may each be used in the form of homopolymers, or with various other monomers which can be copolymerized therewith. Additional illustrative examples of acrylate polymers useful for the present invention are polyacrylates and polymethacrylates which are homopolymers and copolymers of acrylic acid ester and methacrylic acid ester, such as, for example, polyacrylic acid isobutyl ester, polymethacrylic acid methyl ester, polymethacrylic acid ethylhexyl ester, polyacrylic acid ethyl ester; copolymers of various acrylic acid esters and/or methacrylic acid esters, such as, for example, methacrylic acid methyl ester/acrylic acid cyclohexyl ester copolymers; and copolymers of acrylic acid esters and/or methacrylic acid esters with styrene and/or alphamethylstyrene, as well as the graft polymers and copolymers and polymer mixtures composed of acrylic esters, methacrylic acid esters, styrene and butadiene. A group of transparent, weatherable blends of acrylate polymers and polyvinylidene fluoride polymers useful for practicing the present invention are disclosed in U.S. Pat. No. 3,524,906. The disclosures of this patent, and all other patent references cited herein, are specifically intended to be incorporated herein by reference.

Fluoropolymers useful for practicing the present invention include polymers and copolymers formed from trifluoroethylene, tetrafluoroethylene, hexafluoropropylene, monochlorotrifluoroethylene and dichlorodifluoroethylene. Copolymers of these monomers formed from fluoroolefins such as vinylidene fluoride are also useful. Further illustrative examples of fluoropolymers useful for practicing the present invention include polyvinyl fluoride and polyvinylidene fluoride. The fluoropolymer may be a fluorinated ethylene/propylene copolymer (the easily-fabricated "FEP" resins), or a copolymer of ethylene/chlorotrifluoroethylene such as "HALAR." Vinylidene fluoride/hexafluoropropene and vinylidene fluoride/perfluoro (alkyl vinyl ether) dipolymers and terpolymers with tetrafluoroethylene are additional illustrative fluoropolymers useful for practicing the present invention.

A preferred weatherable polymer for use in the present invention is an alloy of an acrylic polymer and polyvinylidene fluoride, such as "FLUOREX" (a trademark of Rexham Corporation).

Urethane polymers useful for practicing the present invention are prepared by reacting a polyisocyanate with a compound containing at least two active hydrogen atom, such as a polyol, a polyamine, or a polyisocyanate. Polyurethane resins for use in the present invention should be selected from resins in which the reactants have been chosen to provide weatherable, thermoformable polymers. Numerous suitable polyurethane resins useful for practicing the present invention are available. Generally, aromatic polyisocyanates tend to yellow, and aliphatic polyisocyanates are more preferred. Particularly noteworthy recent developments in this area are disclosed in U.S. Pat. No. 4,578,426 (disclosing resins which give coatings resistant to gasoline and having high flexibility, scratch resistance and weather resistance) and U.S. Pat. No. 4,501,852 (disclosing chemical resistant, abrasion resistant, elastic and durable polyurethanes).

In addition, films formed of vinyl polymers, such as polyvinylchloride films and films formed from copolymers thereof, may also be used to practice the present invention, though such films are generally not as weatherable as films formed from the previously discussed polymers.

The pigmented coating is preferably formed of the same polymer as the preformed film, or may optionally be formed of a different polymer which will bond to the preformed film during the manufacture of the decorative sheet material, as explained below. The adhesive layer 13 carried by the inner surface of the pigmented coating is preferably a film laminated to the pigmented coating. Bonding of the pigmented coating to a film adhesive layer can be achieved with an intermediate bonding layer or layers in accordance with known laminating procedures, and with known adhesives. The adhesive layer is selected to bond to the substrate for which the decorative sheet material is intended. For example, a decorative sheet material having a fusible olefin adhesive layer can be placed in a mold during injection of an olefin resin. Another approach is to bond a PVC film to a fluoropolymer pigment layer with an acrylic adhesive and, in turn, bond the PVC film to an olefin film with a polyester isocyanate adhesive. The pigment layer my also be laminated to an olefin film with a permanent type acrylic pressure-sensitive adhesive. Still another approach is to coat the pigment layer with a soluble olefin resin which adheres thereto and bonds to the injected resin without having or requiring an olefin film layer. Such a resin is chlorinated polyolefin 343-1 from Eastman Kodak. This resin may be used in conjunction with an acrylic primer or ingredient to bond to desired fluorocarbon films. Corona treatment of the olefin surface to be bonded to the cast film may optionally be used to achieve an optimum bond. Bonding may also be improved by surface treating the cast film, as by corona treatment.

Figure 3:
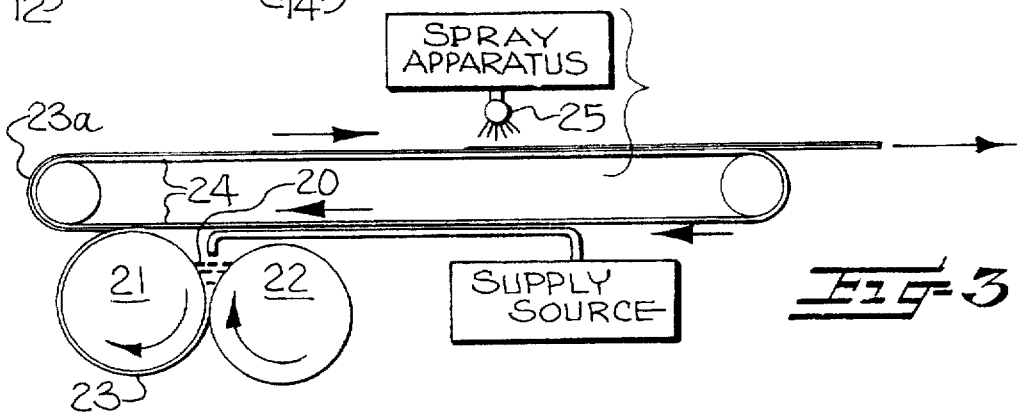
FIG. 3 is a schematic illustration of a method for making decorative sheet materials of the present invention.

The preferred method for making a decorative sheet material of the present invention is by reverse-roll coating, as illustrated in FIG. 3. Reverse-roll coating involves providing a puddle 20 of polymer solution between an applicator roll 21 and a metering roll 22. The rolls (21,22), which rotate in the same direction, are spaced apart a predetermined distance to meter a film 23 of the solution onto the applicator roll. The film on the applicator roll is then applied to a suitable carrier 24, typically a flexible steel band. This film 23a is then sprayed by a spraying apparatus 25 with a liquid pigmented polymer which has reflective flakes suspended therein to form the decorative sheet material described above. The liquid pigmented polymer is sprayed on the film before the film has solidified. The coated film is then dried, removed from the carrier, and—if desired—provided with an adhesive layer 13 in accordance with known procedures. If flakes are present in the pigmented polymer, spraying the pigmented polymer onto the cast film before the cast film has solidified allows the flakes to settle into the cast layer somewhat, and gives a greater depth effect to the film.

The foregoing procedure is preferably used to coat the entire undersurface of the cast film. If desired, a striking visual effect can be achieved by spraying portions of the undersurface of the cast film with a liquid pigmented polymer, after which the other portions of the undersurface of the cast film is sprayed with a liquid pigmented polymer pigmented a different color than the preceding pigmented polymer. This technique can be used to provide decorative sheet materials which have a two-tone colored appearance, and the coatings can overlap so that the colored regions provided by this technique feather into one another. In combination, these two polymer coatings provide an opaque and uninterrupted (in opacity) coating to the undersurface of the substantially clear film.

Figure 4:
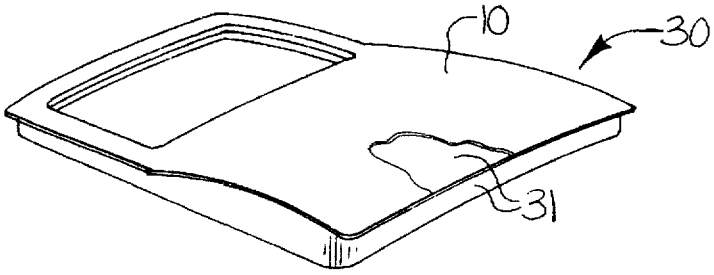
FIG. 4 is an article of the present invention with a portion broken away to show the decorative sheet material on the outer surface thereof.

The decorative sheet material of the present invention can be adhered to a supporting substrate in accordance with known laminating or bonding techniques. Illustrative examples of supporting substrates include metal, wood, and molded polymer substrates. As illustrated in FIG. 4, a shaped article 30 of the present invention comprises a supporting substrate 31 which has a contoured outer surface, and a decorative sheet material 10 adhered to one side of the substrate so as to conform to the contoured surface of the substrate. As explained above, particularly suitable shaped articles of the present invention are exterior automobile body parts such as body panels and bumpers.

The decorative sheet material can be bonded to molded polymer substrates by placing the sheet material into a mold having a contoured, three-dimensional molding surface. A moldable polymer is then introduced into the mold on one side of the sheet material. The sheet material is then molded into a contoured three-dimensional configuration conforming to the molding surface of said mold, while molding said polymer to form a shaped article with the decorative sheet material adhered to the outer surface thereof. Preferably, the decorative sheet material includes an adhesive layer 13, as described above, formed of a polymer different from the pigmented coating, wherein the decorative sheet material is placed into the mold with the adhesive layer oriented inwardly away from the molding surface so as to become adhered to the moldable polymer.

Suitable polymers for the molded polymer substrate include, for example, polyvinyl chloride, polycarbonate, polystyrene, acrylonitrile-butadienestyrene, polyethylene, polypropylene, polyethylene terephthalate glycol (PETG), nylon, and RIM urethanes. Polyolefin homopolymers and copolymers (ionomers, etc.) are inexpensive thermoplastic resins which have excellent molding properties and are particularly preferred for practicing the present invention. Polypropylene, for example, when glass filled and foamed with a blowing agent, has performance properties suitable for structural or engineering uses. Acid copolymers of polyethylene, such as Du Pont's "SURLYN," are similar in performance and in addition have exceptional toughness.

Preferably, the tear strength of the preformed film is less than the bond strength of the preformed film to the supporting substrate. This will prevent tears from developing in the preformed film, running across the surface of the article, and quickly destroying the article.

In the drawings and specification, typical preferred embodiments of the invention have been disclosed. Although specific terms are employed, they are used in a generic and descriptive sense only and not for purposes of limitation, the scope of the invention being set forth in the following claims.

That which is claimed is:

1. A flexible decorative sheet material for use in surfacing automobile body panels [and the like], said sheet material being characterized by having the appearance of a base coat/clear coat paint finish when viewing the outer surface thereof, and comprising a substantially transparent *preformed film* outer layer formed of a substantially molecularly unoriented cast polymer *formed from a member selected*

*from the group consisting of fluoropolymers, acrylate polymers, vinyl polymers and blends thereof,* and a pigmented coating on the undersurface of said *preformed film* outer layer and visible therethrough, said pigmented coating having reflective flakes uniformly distributed therein and oriented generally parallel to said outer layer to impart to the sheet material the appearance of a base coat/clear coat paint finish.

2. A decorative sheet material as claimed in claim 1, further comprising an adhesive layer carried by said pigmented coating.

3. A decorative sheet material as claimed in claim 1, wherein said pigmented coating comprises a first pigmented coating on certain portions of the undersurface of the outer layer and visible therethrough, and a second pigmented coating of a different color on certain other portions of the undersurface of the outer layer, which second pigmented coating is also visible therethrough.

4. A decorative sheet material as claimed in claim 1, wherein said outer layer is formed from a substantially clear film.

5. A decorative sheet material as claimed in claim 4, wherein said pigmented coating is of a thickness less than said substantially clear film.

[6. A decorative sheet material as claimed in claim 4, wherein said substantially clear film is formed from a weatherable polymer selected from the group consisting of fluoropolymers, acrylate polymers, urethane polymers, vinyl polymers, and blends thereof.]

7. A flexible decorative sheet material for use in surfacing automobile body panels [and the like], said sheet material being characterized by having the appearance of a base coat/clear coat paint finish when viewing the outer surface thereof, and comprising a clear substantially molecularly unoriented weatherable *preformed polymer* film *formed from a member selected from the group consisting of fluoropolymers, acrylate polymers, vinyl polymers and blends thereof,* and a pigmented coating on the undersurface of said *preformed* film and visible therethrough, said pigmented coating having reflective flakes uniformly distributed therein in generally parallel alignment to said film to impart to the sheet material the appearance of a base coat/clear coat paint finish.

8. A decorative sheet material as claimed in claim 7, wherein the mean angle of inclination of said flakes to said film is less than about 6.5 degrees.

9. A decorative sheet material as claimed in claim 7, wherein said pigmented coating is of a thickness less than said film.

[10. A decorative sheet material as claimed in claim 7, wherein said weatherable film comprises a polymer selected from the group consisting of fluoropolymers, acrylate polymers, urethane polymers, vinyl polymers, and blends thereof.]

11. A decorative sheet material as claimed in claim 7, further comprising an adhesive layer carried by said pigmented coating.

12. A flexible decorative sheet material for use in surfacing automobile body panels [and the like], said sheet material being characterized by having the appearance of a base coat/clear coat paint finish when viewing the outer surface thereof, and comprising a clear, substantially colorless and substantially molecularly unoriented cast *preformed* polymer film *formed from a member selected from the group consisting of floropolymers, acrylate polymers, vinyl polymers and blends thereof,* and a pigmented coating on the undersurface of said *preformed* film and visible therethrough, said pigmented coating having a thickness less than said film and including reflective metallic flakes uniformly distributed therein and oriented in generally parallel alignment to said film to impart to the sheet material the appearance of a base coat/clear coat paint finish.

[13. A decorative sheet material as claimed in claim 12, wherein said film comprises a polymer selected from the group consisting of fluoropolymers, acrylate polymers, urethane polymers, vinyl polymers, and blends thereof.]

14. A decorative sheet material as claimed in claim [13] *12*, wherein said pigmented coating is of a thickness less than said film.

15. A decorative sheet material as claimed in claim 14, wherein the mean angle of inclination of said flakes to said film is less than about 6.5 degrees.

16. A shaped article having a contoured decorative outer surface, comprising a supporting substrate and a decorative sheet material adhered to one side of said substrate and conforming to said contoured surface, said decorative sheet material being characterized by having the appearance of a base coat/clear coat paint finish when viewing the outer surface thereof, and comprising a substantially clear *preformed film* outer layer formed of a substantially molecularly unoriented cast polymer *formed from a member selected from the group consisting of fluoropolymers, acrylate polymers, vinyl polymers and blends thereof,* and a pigmented coating on the undersurface of said *preformed film* outer layer and visible therethrough, said pigment coating having reflective flakes uniformly distributed therein to impart to the outer surface of the article the appearance of a base coat/clear coat paint finish.

17. A shaped article as claimed in claim 16, wherein said substantially clear outer layer comprises a substantially molecularly unoriented cast film.

18. A shaped article as claimed in claim 16, wherein said pigmented coating has reflective metallic flakes uniformly distributed therein.

19. A shaped article as claimed in claim 18, wherein said supporting substrate is a rigid metal substrate.

20. A shaped article as claimed in claim 18, wherein said supporting substrate is a molded polymer substrate.

21. A shaped article as claimed in claim 18, further comprising an adhesive layer carried by said pigmented coating and adhered to said supporting substrate.

*22. A flexible decorative sheet material for use in surfacing automobile body panels, said sheet material being characterized by having the appearance of a base coat/clear coat paint finish when viewing the outer surface thereof, and comprising a substantially transparent preformed film outer layer formed of a substantially molecularly unoriented cast polymer comprising an alloy of polyvinylidene fluoride and an acrylic polymer and a pigmented coating on the undersurface of said preformed film outer layer and visible therethrough, said pigmented coating having reflective flakes uniformly distributed therein and oriented generally parallel to said outer layer to impart to the sheet material the appearance of a base coat/clear coat paint finish.*

*23. A flexible decorative sheet material for use in surfacing automobile body panels, said sheet material being characterized by having the appearance of a base coat/clear coat paint finish when viewing the outer surface thereof, and comprising a clear, substantially molecularly unoriented weatherable thermoformable film comprising an alloy of polyvinylidene fluoride and an acrylic polymer and a thermoformable pigmented coating on the undersurface of said film and visible therethrough, said pigmented coating comprising an alloy of polyvinylidene fluoride and an acrylic*

*polymer and having reflective flakes uniformly distributed therein in generally parallel alignment to said film to impart to the sheet material the appearance of a base coat/clear coat paint finish.*

*24. A shaped article having a contoured decorative outer surface, comprising a molded polymer supporting substrate and a flexible decorative sheet material adhered to one side of said substrate and conforming to said contoured surface, said decorative sheet material being characterized by having the appearance of a base coat/clear coat paint finish when viewing the outer surface thereof, and comprising a substantially clear outer layer formed of a substantially molecularly unoriented thermoformable polymer comprising an alloy of polyvinylidene fluoride and an acrylic polymer and a pigmented coating on the undersurface of said outer layer and visible therethrough, said pigment coating comprising an alloy of polyvinylidene fluoride and an acrylic polymer and having reflective flakes uniformly distributed therein to impart to the outer surface of the article the appearance of a base coat/clear coat paint finish.*

*25. A shaped article having a contoured decorative outer surface, comprising a molded polymer supporting substrate and a flexible decorative sheet material adhered to one side of said substrate and conforming to said contoured surface, said decorative sheet material being characterized by having the appearance of a base coat/clear coat paint finish when viewing the outer surface thereof, and comprising a substantially clear outer layer formed of a substantially molecularly unoriented thermoformable polymer formed from a member selected from the group consisting of fluoropolymers, acrylate polymers, vinyl polymers and blends thereof, a pigmented coating on the undersurface of said outer layer and visible therethrough, said pigmented coating comprising a thermoformable polymer having reflective flakes uniformly distributed therein to impart to the outer surface of the article the appearance of a base coat/clear coat paint finish, and a polyolefin polymer film layer having one surface thereof laminated to said pigmented coating by an intermediate adhesive bonding layer and having the opposite surface thereof adhered to said molded polymer supporting substrate.*

*26. A flexible decorative sheet material for use in surfacing automobile body parts, said sheet material being characterized by having the appearance of a base coat/clear coat paint finish when viewing the outer surface thereof, and comprising a substantially transparent preformed film outer layer formed of a substantially molecularly unoriented cast polymer formed from a member selected from the group consisting of floropolymers, acrylate polymers, vinyl polymers and blends thereof, and a pigmented coating on the under surface of said preformed film outer layer and visible therethrough, said pigmented coating having reflective flakes uniformly distributed therein and oriented generally parallel to said outer layer to impart to the sheet material the appearance of a base coat/clear coat paint finish.*

*27. A flexible decorative sheet material for use in surfacing automobile body parts, said sheet material being characterized by having the appearance of a base coat/clear coat paint finish when viewing the outer surface thereof, and comprising a clear, substantially molecularly unoriented weatherable preformed polymer film formed from a member selected from the group consisting of floropolymers, acrylate polymers, vinyl polymers and blends thereof, and a pigmented coating on the under surface of said preformed film and visible therethrough, said pigmented coating having reflective flakes uniformly distributed therein in generally parallel alignment to said film to impart to the sheet material the appearance of a base coat/clear coat paint finish.*

*28. A flexible decorative sheet material for use in surfacing automobile body parts, said sheet material being characterized by having the appearance of a base coat/clear coat paint finish when viewing the outer surface thereof, and comprising a clear, substantially colorless and substantially molecularly unoriented cast preformed polymer film formed from a member selected from the group consisting of floropolymers, acrylate polymers, vinyl polymers, and blends thereof, and a pigmented coating on the under surface of said preformed film and visible therethrough, said pigmented coating having a thickness less than said film and including reflective metallic flakes uniformly distributed therein and oriented in generally parallel alignment to said film to impart to the sheet material the appearance of a base coat/clear coat paint finish.*

*29. A flexible decorative sheet material for use in surfacing automobile body parts, said sheet material being characterized by having the appearance of a base coat/clear coat paint finish when viewing the outer surface thereof, and comprising a substantially transparent preformed film outer layer formed of a substantially molecularly unoriented cast polymer comprising an alloy of polyvinylidene fluoride and an acrylic polymer and a pigmented coating on the under surface of said preformed film outer layer and visible therethrough, said pigmented coating having reflective flakes uniformly distributed therein and oriented generally parallel to said outer layer to impart to the sheet material the appearance of a base coat/clear coat paint finish.*

*30. A flexible decorative sheet material for use in surfacing automobile body parts, said sheet material being characterized by having the appearance of a base coat/clear coat paint finish when viewing the outer surface thereof, and comprising a clear, substantially molecularly unoriented weatherable thermoformable film comprising an alloy of polyvinylidene fluoride and an acrylic polymer and a thermoformable pigmented coating on the under surface of said film and visible therethrough, said pigmented coating comprising an alloy of polyvinylidene fluoride and an acrylic polymer and having reflective flakes uniformly distributed therein in generally parallel alignment to said film to impart to the sheet material the appearance of a base coat/clear coat paint finish.*

* * * * *